(12) United States Patent
Kawahara

(10) Patent No.: US 7,401,769 B2
(45) Date of Patent: Jul. 22, 2008

(54) GAS SPRING

(75) Inventor: Fumio Kawahara, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/459,063

(22) Filed: Jun. 11, 2003

(65) Prior Publication Data

US 2004/0100006 A1  May 27, 2004

(30) Foreign Application Priority Data

Nov. 21, 2002  (JP) ............................. 2002-338519

(51) Int. Cl.
*F16F 9/00* (2006.01)
(52) U.S. Cl. ................ 267/64.28; 267/124; 188/322.17
(58) Field of Classification Search ............. 267/64.11, 267/64.28, 120, 124; 188/322.17; 92/153, 92/168, 165 R; 29/896.9, 896.91, 896.93; 24/18.2
See application file for complete search history.

(56) References Cited

U.S. PATENT DOCUMENTS

| 4,102,538 A | * | 7/1978 | Bertin .......................... 277/565 |
| 4,108,423 A | * | 8/1978 | Skubal ..................... 267/64.15 |
| 4,306,729 A | * | 12/1981 | Hiramatsu et al. .......... 277/570 |
| 4,718,647 A | * | 1/1988 | Ludwig .................... 267/64.11 |
| 4,948,104 A | * | 8/1990 | Wirges ..................... 267/64.11 |
| 5,011,121 A | * | 4/1991 | Oriola et al. .............. 267/64.11 |
| 5,048,647 A | * | 9/1991 | Fuhrmann et al. ....... 188/322.17 |
| 5,735,371 A | * | 4/1998 | Jobelius et al. .............. 188/276 |
| 6,705,201 B2 | * | 3/2004 | Knopp et al. .................. 91/437 |
| 2003/0052458 A1 | * | 3/2003 | Zafar .......................... 277/534 |

FOREIGN PATENT DOCUMENTS

| JP | SHO 56-99139 | 2/1979 |
| JP | SHO 58-175233 | 11/1983 |
| JP | HE1221042 | 1/1990 |

* cited by examiner

*Primary Examiner*—Bradley T King
(74) *Attorney, Agent, or Firm*—Orum & Roth LLC

(57) ABSTRACT

A method of manufacturing a gas spring including the steps of fitting and inserting a first seal member, an annular space member, a second seal member, and a rod guide, to an outer periphery of a piston rod in accordance with this order from a side of a piston, a step of providing a piston rod assembly in which a lubricant is previously injected, in an annular chamber defined among the first seal member, the space member and the second seal member, and a step of charging a pressurized gas into an inner portion of a cylinder from an opening portion of the cylinder under a sealed state, and thereafter pressing the rod guide fitted and inserted to the piston rod, thereby inserting the piston rod assembly into the inner portion of the cylinder from the opening portion of the cylinder and fixing the rod guide to the cylinder.

13 Claims, 6 Drawing Sheets

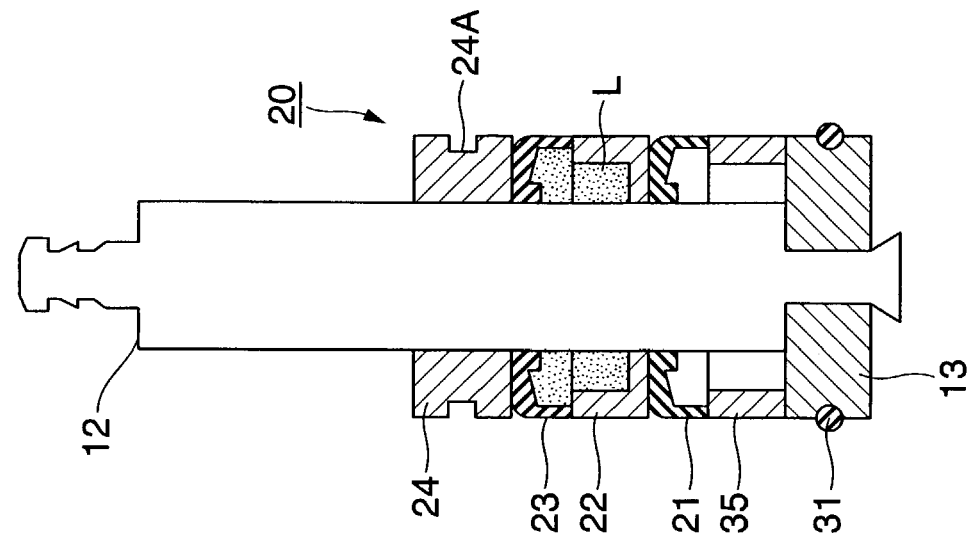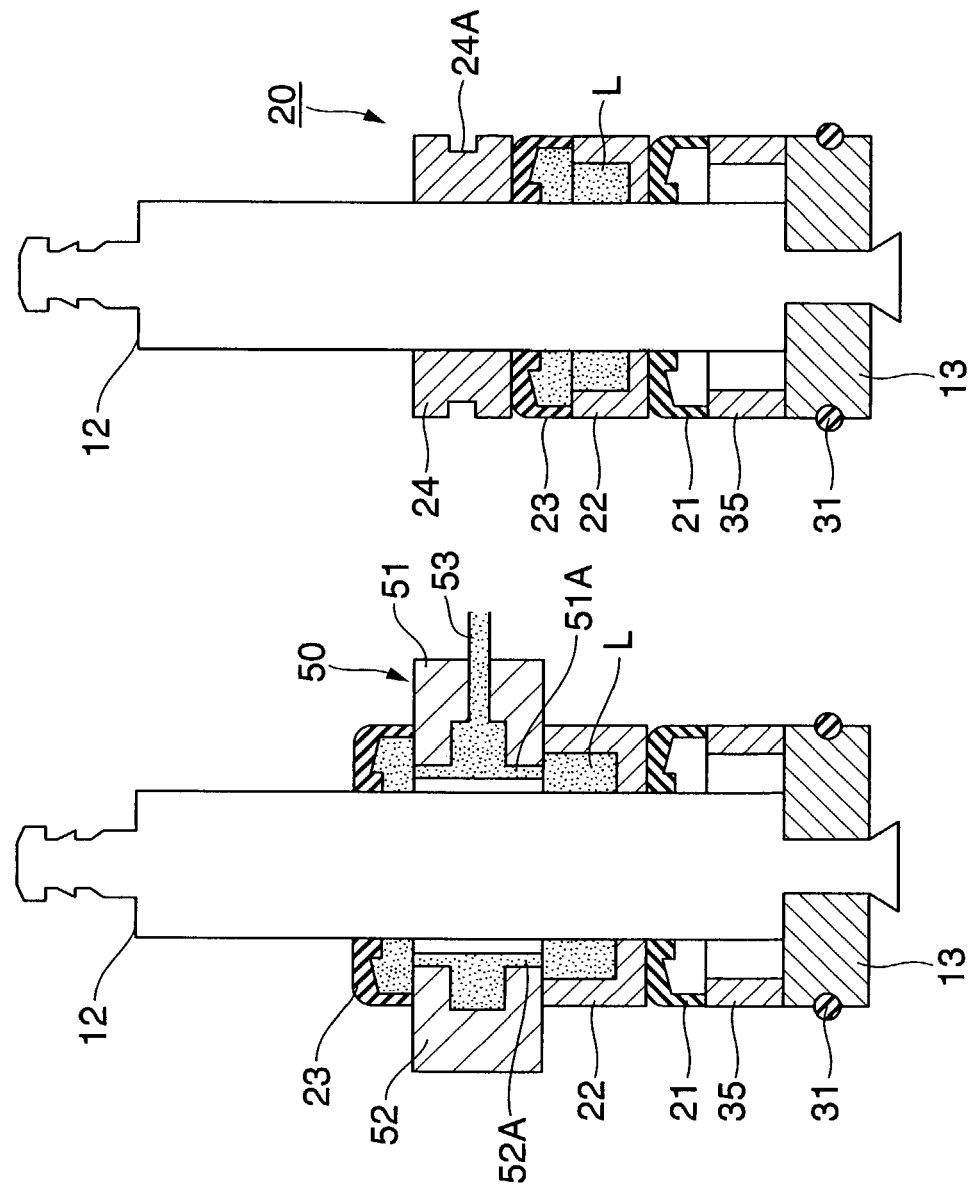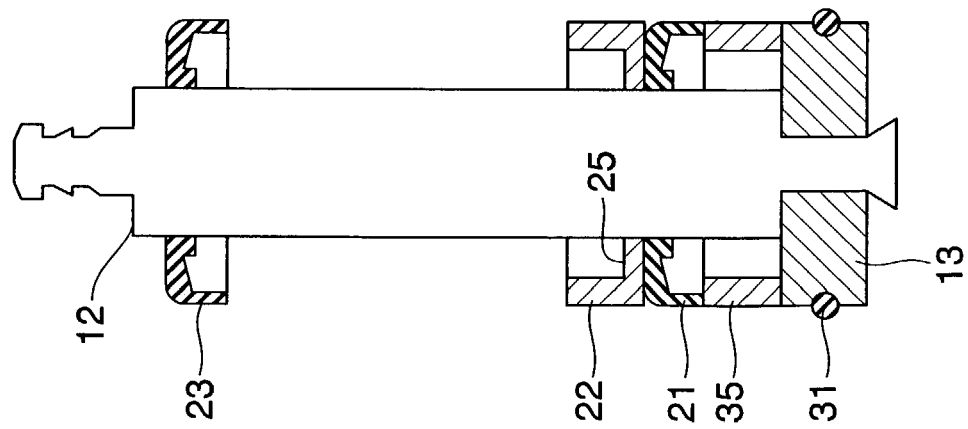

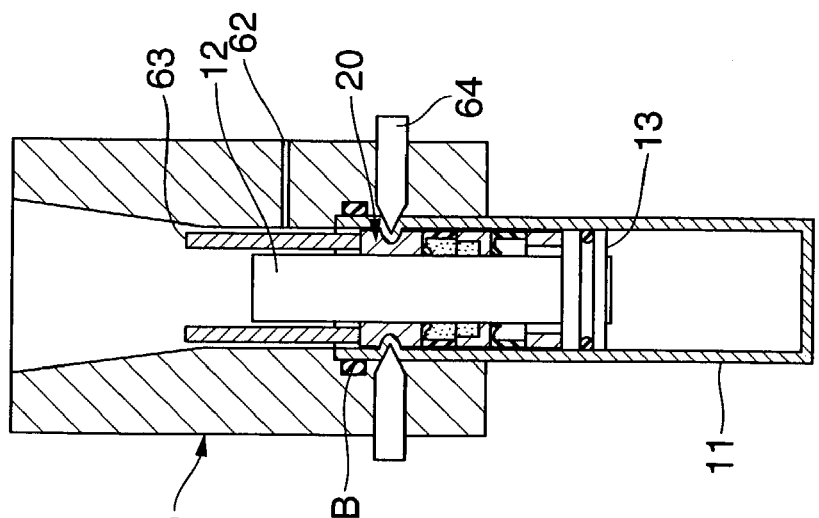
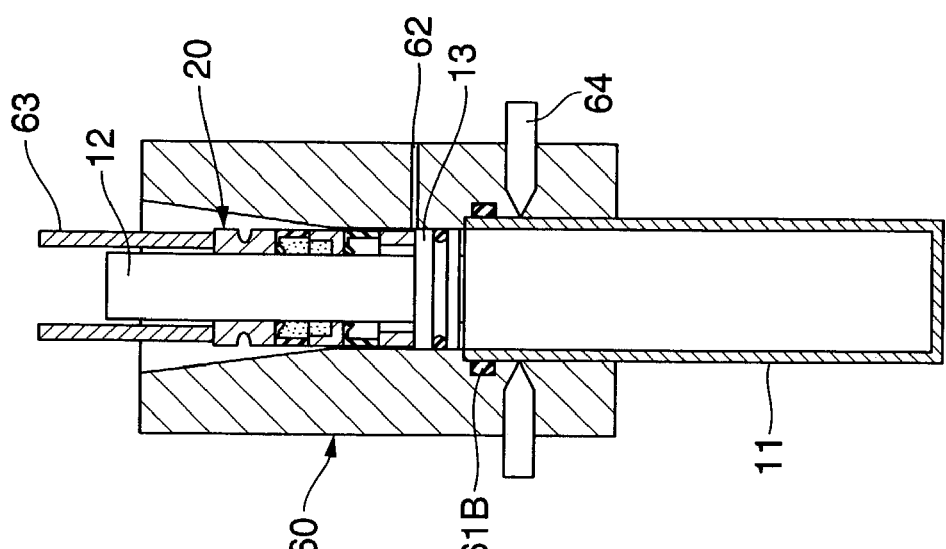
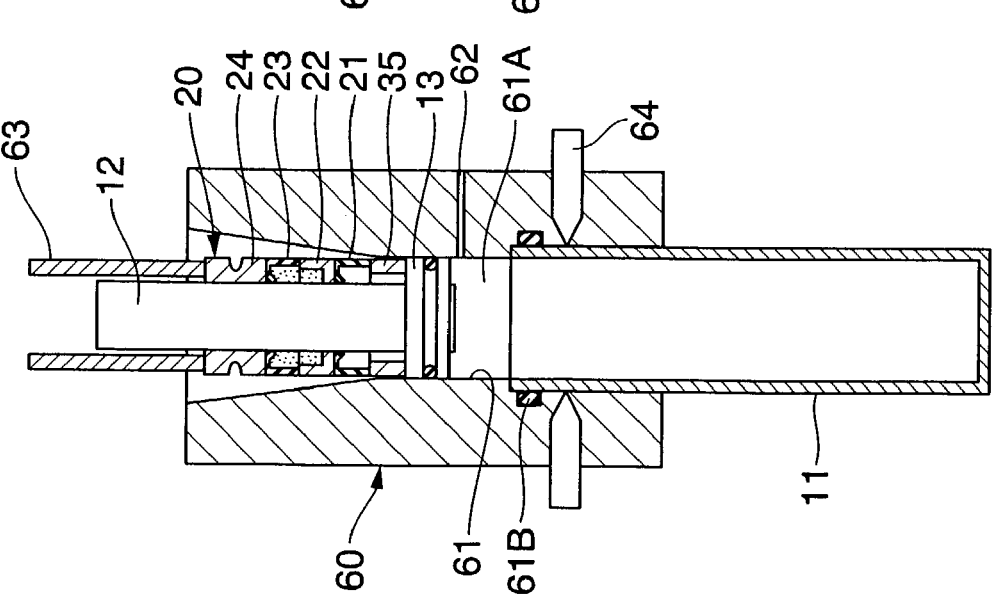

GAS SPRING

BACKGROUND OF THE INVENTION

1. Field of the Invention

The present invention relates to a gas spring which is interposed between a vehicle body and a back door or the like in a vehicle, and is preferably used for applying an assist force when opening the door.

2. Description of the Related Art

Since the back door of a vehicle is generally mounted so as to be opened and closed about a horizontal axis, a gas spring device employs an inverted type gas spring structured such that a cylinder is positioned in an upper side and a piston rod is positioned in a lower side when the back door is closed.

In the gas spring structured as mentioned above, a small amount of working fluid is injected within the cylinder for lubricating a seal lip portion of a seal member and the like. Accordingly, when the door is closed, since the working fluid moves to a side of a cylinder opening end portion so as to dip the seal lip portion, no oil film break is generated between the piston rod and the seal lip portion, so that no gas leaks to the outer side.

However, in some types of vehicles, the gas spring is used in a horizontal state. In this case, the seal lip portion of the seal member is not sufficiently dipped with the working fluid. As a result, an oil film is not formed between the seal lip portion and an outer periphery of the piston rod, and a pressurized gas leaks to the outer side of the cylinder due to a lack of seal caused by the oil film break or an abrasion in the seal lip portion.

In a gas cylinder for solving the problem mentioned above, there is a gas spring in which two seal members are provided in an opening end portion of the cylinder so as to be spaced in an axial direction, and a lubricant such as a working fluid or grease is injected between two seal members (Japanese Patent Application Laid-Open No. 2-21042 (patent publication 1)).

In the gas spring structured as mentioned above, since the lubricant such as grease or the like injected between two seal members always wets or lubricates the seal lip portion of the seal member even in the case that the gas spring is arranged in the horizontal state, the pressurized gas in the inner portion of the cylinder does not leak to the outer side.

The gas cylinder of the patent publication 1 has the following problems.

(1) A packing 4 is clamped among a piston rod guide member 5, a disc 7 and a support sleeve 8, and is fixed to a portion between an annular protruding portion 6 formed in a cylinder and a collared cylinder end portion 12. Thereafter, a pressurized gas is charged into the cylinder from an inner periphery of the packing 4.

As a result, since the gas is charged through a small annular gap between the inner periphery of the packing 4 and a piston rod 3, there is a problem that a long time is required for charging the gas, and productivity is not good.

Further, since the piston rod guide member 5 having a small annular gap is further arranged in a lower side of the packing 4, there is a problem in that the time for charging the pressured gas is further increased.

(2) After charging the pressurized gas, the lubricant is injected in an annular chamber between the support sleeve 8 and the piston rod 3, and the annular chamber is sealed with respect to the outer side by a packing 9 and a close ring 10. That is, the close ring 10 is provided in an upper portion of the packing for sealing the lubricant, and closes the opening end portion of the cylinder. As a result, in addition to the piston rod guide member 5, another piston rod guide member, that is, the close ring 10 is provided as a member for guiding the piston rod. An increase in a number of parts is caused, which becomes expensive.

SUMMARY OF THE INVENTION

An object of the present invention is to provide a method of manufacturing a gas spring such that the time for charging pressurized gas into a cylinder can be made short. This results in an inexpensive gas spring having a reduced number of parts. In this gas spring, two seal members are provided in an opening end portion of a cylinder so as to be spaced in an axial direction, and a lubricant such as grease or the like is injected between these two seal members.

The present invention relates to a method of manufacturing a gas spring in which a piston rod provided with a piston in a leading end portion is slidably inserted into a cylinder. Two seal members are provided in an opening end portion of the cylinder so as to be spaced in an axial direction, a lubricant is injected between the two seal members, and a pressurized gas is charged in an inner portion of the cylinder.

A first seal member which is in close contact with an outer periphery of the piston rod and an inner periphery of the cylinder, an annular space member which is adjacent to the inner periphery of the cylinder, a second seal member which is in close contact with the outer periphery of the piston rod and the inner periphery of the cylinder, and a rod guide which guides the piston rod, are fitted and inserted to the outer periphery of the piston rod in accordance with this order from a side of the piston.

A piston rod assembly is provided in which a lubricant is previously injected, in an annular chamber defined among the first seal member, the annular space member and the second seal member, in the outer periphery of the piston rod.

A pressurized gas is charged into the cylinder from an opening portion of the cylinder under a sealed state. This presses pressing the rod guide fitted and inserted to the piston rod, thereby inserting the piston rod assembly into the cylinder from the opening portion of the cylinder and fixing the rod guide to the cylinder.

Furthermore, the present invention relate to a gas spring in which a piston rod provided with a piston in a leading end portion is slidably inserted into a cylinder. Two seal members are provided in an opening end portion of the cylinder so as to be spaced in an axial direction. A lubricant is injected between the two seal members, and a pressurized gas is charged in an inner portion of the cylinder.

A first seal member which is in close contact with an outer periphery of the piston rod and an inner periphery of the cylinder, an annular space member which is adjacent to the inner periphery of the cylinder, a second seal member which is in close contact with the outer periphery of the piston rod and the inner periphery of the cylinder, and a rod guide which guides the piston rod, are fitted and inserted to the outer periphery of the piston rod in accordance with this order from a side of the piston.

A piston rod assembly in which a lubricant is previously injected, is provided in an annular chamber defined among the first seal member, the annular space member and the second seal member, in the outer periphery of the piston rod.

A pressurized gas is charged into the cylinder from an opening portion of the cylinder under a sealed state. This presses the rod guide fitted and inserted to the piston rod, thereby inserting the piston rod assembly into the cylinder from the opening portion of the cylinder and fixing the rod guide to the cylinder.

BRIEF DESCRIPTION OF THE DRAWINGS

The present invention will be more fully understood from the detailed description given below and from the accompanying drawings which should not be taken to be a limitation on the invention, but are for explanation and understanding only. The drawings:

FIG. 4 is a schematic view showing an assembling procedure of a piston rod assembly;

FIG. 5 is a schematic view showing a procedure for using a gas charging jig.

DESCRIPTION OF THE PREFERRED EMBODIMENTS

A gas spring 10 is applied, for example, for assisting an opening operation force of a lid body corresponding to a back door provided in a vehicle main body (a support body) so as to open and close in a swing state and for holding a full-open state.

Figure 1:
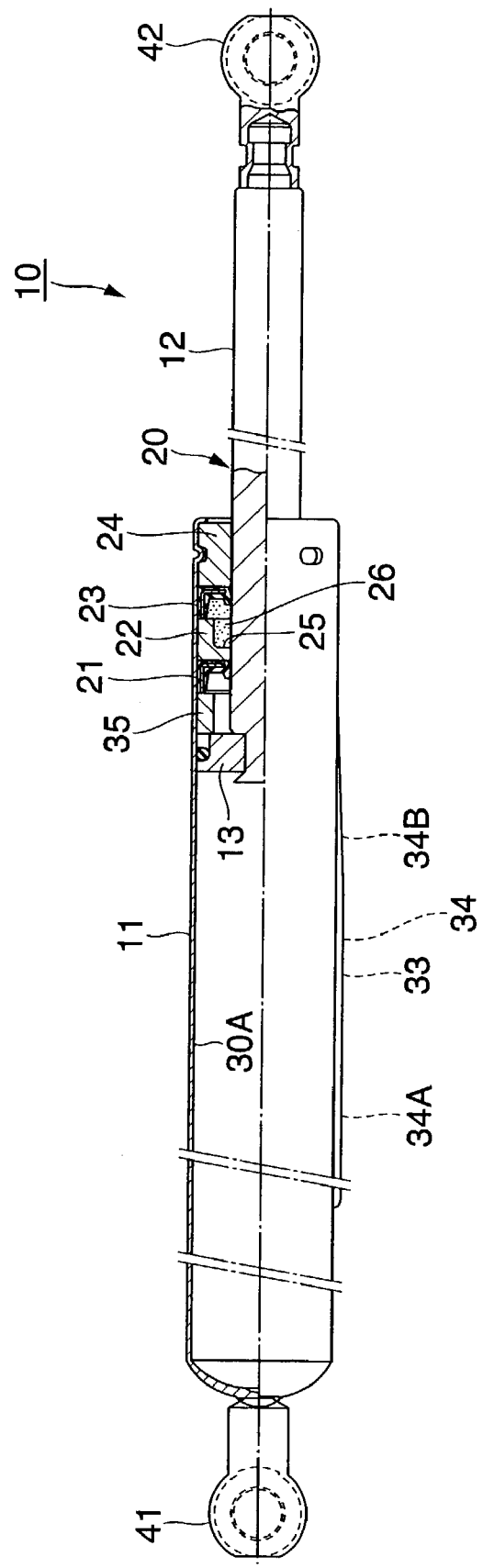
FIG. 1 is a cross sectional view showing a gas spring.
Figure 2:
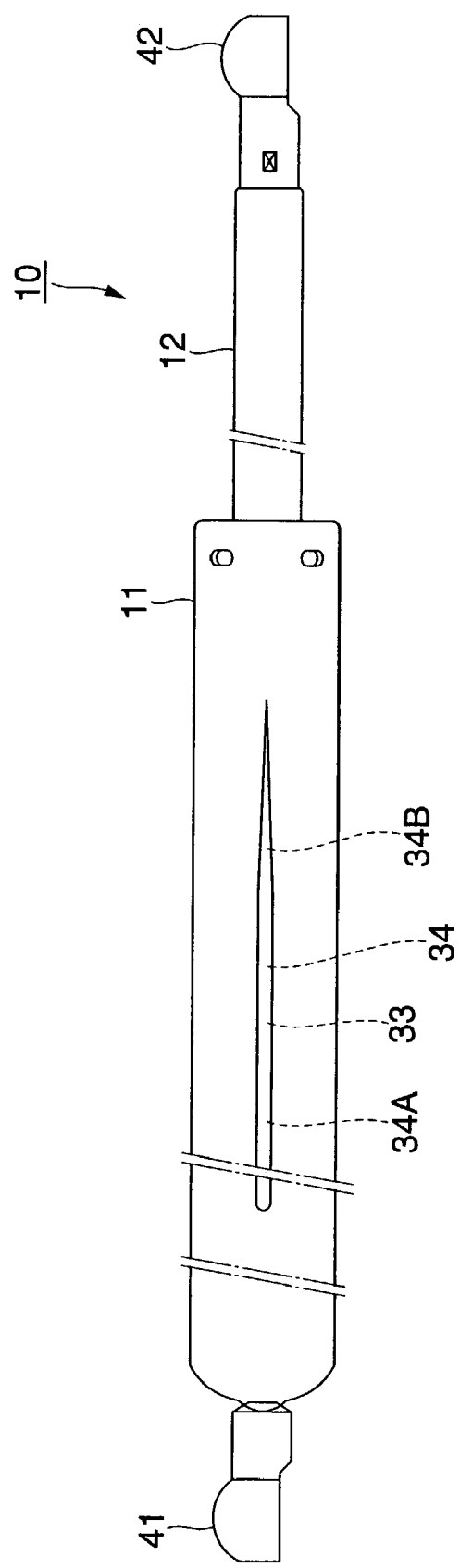
FIG. 2 is a side elevational view of FIG. 1.

The gas spring 10 has a cylinder 11 in which one end is closed, a piston rod 12 which is inserted from another end of the cylinder 11 to an inner portion of the cylinder 11, and a piston 13 which is provided in an insertion leading end portion of the rod 12 into the cylinder 11 and slides along an inner face of the cylinder 11, as shown in FIGS. 1 and 2. The piston 13 is inserted and attached to a small diameter step portion in an end portion of the rod 12, and is fixed by a leading end caulking portion of the rod 12.

Figure 3:
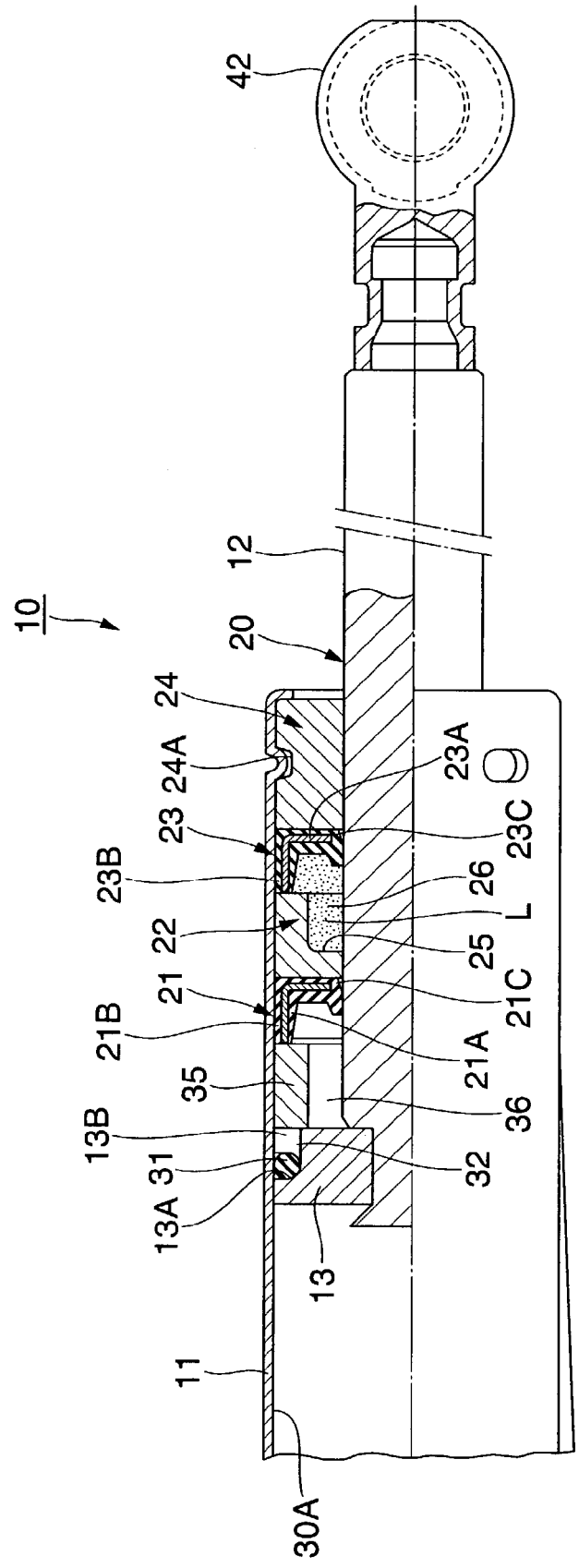
FIG. 3 is an enlarged view of a main portion in FIG. 1.

The gas spring 10 is structured, as shown in FIG. 3, such that a first seal member 21 which is in close contact with an outer periphery of the rod 12 and an inner periphery of the cylinder 11, an annular space member 22 which is adjacent to the inner periphery of the cylinder 11 via an air gap, or in close contact therewith, a second seal member 23 which is in close contact with the outer periphery of the rod 12 and the inner periphery of the cylinder 11, and a rod guide 24 which guides the rod 12 are fitted and inserted to the outer periphery of the rod 12, in accordance with this order from a side of the piston 13. A piston rod assembly 20 in which a lubricant L such as grease or the like is previously injected is provided in an annular chamber 26 which is defined among the first seal member 21, the space member 22 and the second seal member 23, on the outer periphery of the rod 12.

The rod guide 24 is provided with an annular groove 24A in an outer periphery thereof. The rod guide 24 is fixed to the cylinder 11 by caulking and fixing the cylinder 11 to the annular groove 24A, and thereafter by bending an opening end portion of the cylinder 11 to an inner side. The rod guide 24 is made of a sintered alloy or the like.

The gas spring 10 is structured such that a pressurized gas such as air, a nitrogen gas or the like for producing a gas pressure is charged in the inner portion of the cylinder 11, and a small amount of working fluid for lubricating the piston 13 or regulating a gas reaction force is injected therein.

The first seal member 21 is structured such that a reinforcing ring 21A is buried in the first seal member 21. An outer peripheral seal portion 21B provided in a tubular portion of the reinforcing ring 21A is fitted to the inner periphery of the cylinder 11. A seal lip portion 21C is provided in a leading end portion of a support portion elongated to an inner side from one end of the tubular portion of the reinforcing ring 21A. The seal lip portion 21C is fitted and inserted to the outer periphery of the piston rod 12 by engaging a pressure application surface with a side of the piston 13 when the seal lip portion 21C is fitted and inserted from an opposite side of the rod 12 to the piston 13. The seal lip portion 21C is pressed against the outer periphery of the piston rod 12 due to gas pressure within the cylinder 11 applied to the pressure application surface, thereby achieving a self-sealing operation against the gas pressure.

The second seal member 23 is structured such that a reinforcing ring 23A is buried in the second seal member 23. An outer peripheral seal portion 23B provided in a tubular portion of the reinforcing ring 23A is fitted to the inner periphery of the cylinder 11. A seal lip portion 23C is provided in a leading end portion of a support portion elongated to an inner side from one end of the tubular portion of the reinforcing ring 23A. The seal lip portion 23C is fitted and inserted to the outer periphery of the piston rod 12 by engaging a scraping surface with a side of the piston 13 when the seal lip portion 23C is fitted and inserted from an opposite side of the rod 12 to the piston 13. The seal lip portion 23 scrapes a lubricant such as grease or the like attached to the outer periphery of the piston rod 12 by means of the scraping surface, thereby preventing the lubricant from leaking to the outer side of the cylinder 11. This achieves a sealing action against the gas pressure within the cylinder 11 in cooperation with the first seal member 21.

The space member 22 is integrally provided with a backup ring 25 for the first seal member 21. The backup ring 25 is provided in an end portion close to the first seal member 21 in the space member 22. The backup ring 25 inhibits the seal lip portion 21C of the first seal member 21 from protruding to a side of the annular chamber 26, and improves durability of the seal lip portion 21C.

In this case, the backup ring 25 may be separated from the space member 22, and may be interposed between the first seal member 21 and the space member 22.

The space member 22 is made, for example, of a polyamide resin containing glass fiber. Accordingly, even when the space member 22 is entangled and is brought into contact with the outer periphery of the piston rod 12, the piston rod 12 is not damaged.

The first seal member 21, the space member 22 and the second seal member 23 are pressed to the side of the rod guide 24 due to the effect of the gas pressure in the inner portion of the cylinder 11, and are held in the inner periphery of the cylinder 11.

The gas spring 10 is structured such that the two seal members 21 and 23 mentioned above are disposed in the opening end portion in which the rod guide 24 of the cylinder 11 is provided, so as to have a space corresponding to a length of the space member 22 in an axial direction. A lubricant having a viscosity such as grease or the like is injected in the annular chamber 26 between two seal members 21 and 23, and a pressurized gas in the inner portion of the cylinder 11 is charged.

When the gas spring 10 is used in an inverted state in which the cylinder 11 is positioned in an upper side and the rod 12 is positioned in a lower side when the corresponding door is closed, the working fluid mentioned above injected in the cylinder 11 is applied against all the area in a cross section of the opening end portion of the cylinder 11. The working fluid dips the seal lip portion 21C of the first seal member 21, prevents the oil film in the piston rod 12 and the seal lip portion 21C from being broken, and prevents the seal lip portion 21C from being worn out, thereby preventing a gas leak. On the other hand, when the gas spring 10 is used not in the inverted state but in the horizontal state, the working fluid can not sufficiently cover the lip portion 21C of the first seal member 21 provided in the opening end portion of the cylinder 11, and the seal lip portion 21C of the first seal member 21 is directly exposed to the pressurized gas in the inner portion of the cylinder 11. However, in the present embodiment, the lubricant such as grease or the like injected in the annular chamber 26 between two seal members 21 and 23 wets or lubricates the seal lip portions 21C and 23C, prevents the oil film in the piston rod 12 and the seal lip portions 21C and 23C from being broken, and prevents the seal lip portions 21C and 23C from being worn out, thereby preventing a gas leak.

The gas spring 10 is structured such that a piston side chamber 30A which does not receive the rod 12, and a rod side chamber 30B which receives the rod 12 are defined in the inner portion of the cylinder 11 by the piston 13. In this structure, the piston 13 is structured such that an annular groove 13A formed in a wide and deep groove shape is provided in a middle portion in a width direction on the outer peripheral surface. Groove-like flow passages 13B communicating with the annular groove 13A are open at a plurality of positions in a peripheral direction on an end face on a side facing the rod side chamber 30B, and a check valve 31 comprising an O-ring is attached to an inner portion of the annular groove 13A. The check valve 31 has a width smaller than the groove width of the annular groove 13A, has an inner diameter larger than a groove bottom diameter of the annular groove 13A, and has an outer diameter closely contacted with the inner face of the cylinder 11. Further, the piston 13 can form a flow passage 32 communicating the piston side chamber 30A with the rod side chamber 30B via a gap between the inner face of the cylinder 11 and the outer diameter of the piston 13, a gap between the annular groove 13A and the check vale 31, and the flow passage 13B. When the piston 13 moves in an elongating direction, the check valve 31 is brought into contact with a wall surface of the annular groove 13A at a side opposite the flow passage 13B so as to close the flow passage 32. When the piston 13 moves in a compressing direction, the check valve 31 is brought into contact with a wall surface of the annular groove 13A in a side of the flow passage 13B so as to open the flow passage 32.

The gas spring 10 has a communication portion 33 communicating the piston side chamber 30A with the rod side chamber 30B when the piston 13 is in a fixed moving range. In the present embodiment, the communication portion 33 is constituted by a groove 34 formed in the inner face of the cylinder 11 which extends in an axial direction of the cylinder 11. A tubular rebound member 35 made of urethane resin or the like is inserted and attached to a portion between the first seal member 21 in the inner portion of the cylinder 11 and the piston 13 so as to freely move in an axial direction. The rebound member 35 forms an air lock chamber 36 in the periphery of the rod 12 at the time of the maximum elongation of the gas spring. A piston load applied to the rebound member 35 at the time of the maximum elongation is received by the lock guide 24 via the tubular portion of the reinforcing ring 21A in the first seal member 21, the space member 22, and the tubular portion of the reinforcing ring 23A in the second seal member 23, whereby the rebound member 35 inhibits a moving end of the piston 13 in the elongating direction. The groove 34 of the communication portion 33 is in one embodiment a rectangular groove having a fixed groove width and formed in a square cross sectional shape, for example, in the same manner as that described in Japanese Patent Application Laid-Open No. 9-158967, and is structured by continuously arranging a damping area 34A having a fixed groove width and a damping throttling area 34B in which a groove width is gradually reduced toward the rebound member 35. Other groove shapes are also possible.

The gas spring 10 is structured such that the cylinder 11 is connected to the vehicle main body and the rod 12 is connected to the lid body. The cylinder 11 is provided with a mounting portion 41 on an outer face of the closed portion at one end. The rod 12 is provided with a mounting portion 42 in a protruding end portion from the cylinder 11.

A description will be given below of the operation of the gas spring 10. When the piston 13 is in a fixed moving range corresponding to the communication portion 33, the piston side chamber 30A and the rod side chamber 30B in both sides of the piston 13 are communicated with each other by the communication portion 33. Under these conditions, gas pressure (a gas reaction force) corresponding to a cross sectional area of the rod 12, is applied to the piston 13 in the elongating direction. The gas reaction force constitutes an assisting force for opening the lid body. An elongating motion and a compressing motion of the gas spring 10 is as follows.

(A) Elongating Process

When the gas reaction force in the elongating direction is applied to the piston 13, the check valve 31 closes the flow passage 32 provided in the piston 13, and the gas in the rod side chamber 30B flows to the piston side chamber 30A through the communication portion 33. Accordingly, the gas reaction force moves the piston 13 in the elongating direction so as to elongate the gas spring 10, and an elongation side damping force is generated by a flow resistance when the gas passes through the communication portion 33. The gas spring 10 is slowly controlled such that the piston 13 moves from the damping area 34A of the communication portion 33 to the damping throttling area 34B, and the gas spring 10 is stopped without generating a rebound shock by forming the air lock chamber 36 at the time of full elongation when the piston 13 moves close to the rebound member 35. Therefore, the gas spring 10 assists an opening force of the lid body and holds the lid body in a full open state.

(B) Compressing Process

The check valve 31 opens the flow passage 32 provided in the piston 13, and the gas in the piston side chamber 30A flows to the rod side chamber 30B through both of the check valve 31 and the communication portion 33. Accordingly, the gas spring 10 is rapidly compressed by making it possible to smoothly move the piston 13 in the compressing direction without a significant damping force, on the basis of a closing force applied to the lid body by an operator, whereby it is possible to rapidly close the lid body.

In the gas spring 10, even in a full-closed condition in which the lid body is closed in a used stage, the communication portion 33 is not communicated with the piston side chamber 30A, and the movement of the piston 13 due to the gas pressure is locked. It is thereby possible to prevent the lid body in the closed condition from naturally opening due to the gas pressure.

Therefore, in accordance with a method of manufacturing the gas spring 10, an assembling procedure of the piston rod assembly 20, and a charging procedure of the pressurized gas in the cylinder 11 are set out as follows.

(Assembling Procedure of Piston Rod Assembly 20: FIG. 4)

(1) A structure obtained by caulking and fixing the piston 13 to the leading end portion of the rod 12 is prepared. The rebound member 35, the first seal member 21, the space member 22 with the backup ring 25, and the second seal member 23 are fitted to the outer periphery of the rod 12 in accordance with this order from the side of the piston 13 (FIG.

4A). In this stage, the rod guide 24 may be fitted and inserted to the opposite side to the piston 13 in the second seal member 23.

(2) A grease injecting jig 50 is attached to a portion between the space member 22 and the second seal member 23. The grease injecting jig 50 is structured such that two-pieces divided injecting rings 51 and 52 are combined so as to hold the rod 12 therebetween from both sides of the rod 12. The lubricant such as grease or the like supplied by a grease supply pipe 53 connected to the injecting ring 51 is injected to the annular chamber 26 among the first seal member 21, the space member 22 and the second seal member 23 from injecting passages 51A and 52A of the injecting rings 51 and 52 (FIG. 4B).

(3) The grease injecting jig 50 is taken out, the second seal member 23 is positioned in close contact with the space member 22, and the rod guide 24 is fitted and inserted to the outer periphery of the rod 12 from the opposite side to the piston 13 in the second seal member 23, whereby the piston rod assembly 20 is obtained (FIG. 4C).

(Sealing Procedure of Pressurized Gas to Cylinder 11: FIG. 5)

(1) A gas charging jig 60 having a through hole 61 with the same axis as the axis of the cylinder 11 is attached to the outer periphery of the opening portion in the cylinder 11 in an airtight manner via an O-ring 61B (FIG. 5A).

(2) A sealed space 61A is formed among the piston rod assembly 20, the gas charging jig 60 and the inner periphery of the cylinder 11 by inserting the piston rod assembly 20 to the through hole 61 of the gas charging jig 60 (FIG. 5A).

(3) The pressurized gas supplied by a gas charging passage 62 of the gas charging jig 60 is charged in the sealed space 61A under the sealed state mentioned in item (2) (FIG. 5A). Therefore, the pressurized gas is charged in the inner portion of the cylinder 11 from the opening portion of the cylinder 11.

(4) The piston rod assembly 20 is inserted to the inner portion of the cylinder 11 from the opening portion of the cylinder 11 by pressing the rod guide 24 fitted and inserted to the rod 12 of the piston rod assembly 20 by a pressing jig 63 (FIG. 5B). When the rod guide 24 is inserted to the opening portion of the cylinder 11, the cylinder 11 is caulked and fixed to the annular groove 24A of the rod guide 24 by a caulking tool 64 (FIG. 5C). Thereafter, the rod guide 24 is fixed to the cylinder 11 by bending the opening end portion of the cylinder 11 to an inner side.

In accordance with the present embodiment, the following operational effects can be obtained.

(1) The first seal member 21, the annular space member 22, the second seal member 23 and the rod guide 24 are fitted and inserted to the outer periphery of the piston rod 12 in accordance with this order from the side of the piston 13. The piston rod assembly 20 in which the lubricant is previously injected is provided in the annular chamber 26 defined among the first seal member 21, the annular space member 22 and the second seal member 23. The pressurized gas is charged into the cylinder 11 from the opening portion of the cylinder 11. Thereafter, the piston rod assembly 20 is inserted into the cylinder 11 from the opening portion of the cylinder 11 by pressing the rod guide 24 fitted and inserted to the piston rod assembly 20.

Accordingly, since it is possible to charge the pressurized gas into the cylinder 11 from the opening portion of the cylinder 11 having a large opening area, it is possible to shorten the charging time and it is possible to improve productivity.

(2) Since the rod guide 24 is positioned at the most opened end portion of the cylinder 11, a narrow path during charging of the pressurized gas, as in the prior art, is not formed.

(3) The lubricant having viscosity such as grease or the like is injected in the annular chamber 26. As a result, even when the piston rod assembly 20 is separated from the cylinder 11, the lubricant does not leak out from the annular chamber 26 of the piston rod assembly 20, unlike the working fluid. Therefore, it is possible to charge the pressurized gas from the opening portion of the cylinder 11.

(4) Since the first seal member 21 is inserted into the cylinder 11 after the pressurized gas is charged, the first seal member 21 is supported in the axial direction by the gas pressure within the cylinder. As a result, unlike the prior art, it is not necessary to form the fixing means such as the cylinder protruding portion 13 or the like supporting the piston rod packing 4 in the upper portion in the axial direction.

(5) The rod guide 24 arranged in the most widely opened end portion of the cylinder 11 can double as a backup member of the second seal member 23, and can double as a cap member closing the opening end portion of the cylinder 11. It is thereby possible to reduce the number of parts, and it is possible to make the structure inexpensive.

(6) The upper end of the through hole 61 in the gas charging jig 60 can be sealed by the seal ring in the outer periphery of the piston 13, the first seal member 21 and the like. This is accomplished by inserting the piston rod assembly 20 to which the first seal member 21, the annular space member 22, the second seal member 23 and the rod guide 24 are fitted and inserted, to the through hole 61, by using the gas charging jig 60 having the through hole 61 having the same axis as the axis of the cylinder 11, while being fitted and inserted to the outer periphery of the opening portion of the cylinder 11. As a result, it is possible to charge the gas into the cylinder 11 under sealed conditions, and it is possible to insert the piston rod assembly 20.

It is thereby possible to shorten the gas charging time, and it is possible to improve productivity.

(7) The rod guide 24 is fixed with caulking to the cylinder 11 by fixing the outer peripheral portion of the cylinder 11 to the annular groove 24A of the rod guide 24 and thereafter bending the opening end portion of the cylinder 11 to the inner side.

Since the axial force applied to the rod guide 24 at a time of bending the opening end portion of the cylinder 11 to the inner side is supported by the fixing portion of the cylinder 11 fixed to the annular groove 24A formed in the outer periphery of the rod guide 24, no difficulty is caused for bending the opening end portion of the cylinder 11.

(8) The first seal member 21 maintain a self-supporting property by means of reinforcing ring 21A which is constituted by the tubular portion and the support portion. The tubular portion is fitted to the inner periphery of the cylinder 11 via the outer peripheral seal portion 21B, and can support itself in the inner periphery of the cylinder 11 together with the gas pressure within the cylinder 11. The gas pressure is applied to the pressure application surface of the seal lip portion 21C so as to press against the outer periphery of the piston rod 12, thereby achieving a self-sealing effect with respect to the gas pressure.

(9) The second seal member 23 can keep a self-supporting property by means of reinforcing ring 23A which is constituted by the tubular portion and the support portion. The tubular portion is fitted to the inner periphery of the cylinder 11 via the outer peripheral seal portion 23B, and can support itself in the inner periphery of the cylinder 11 in cooperation with the gas pressure within the cylinder 11.

The scraping surface of the seal lip portion 23C scrapes the lubricant such as the grease or the like attached to the outer periphery of the piston rod 12, thereby inhibiting the lubricant from leaking to the outer portion of the cylinder 11, and carrying out a sealing effect with respect to gas pressure in cooperation with the first seal member 21.

(10) As a result of the function of the backup ring 25, it is possible to inhibit the seal lip portion 21C of the first seal member 21 from protruding to the side of the annular chamber 26, and it is possible to improve durability of the seal lip portion 21C.

(11) The annular space member 22 and the backup ring 25 are integrally formed. Accordingly, it is possible to reduce the number of the parts fitted and inserted to the outer periphery of the piston rod 12. Assembling workability can be improved, and a lubricant such as grease or the like can be easily injected.

The smaller the annular gap between the outer periphery of the piston rod 12 and the inner periphery of the backup ring 25, the more the protrusion of the seal lip portion 21C is inhibited. However, since the space member 22 is supported to the inner periphery of the cylinder 11 by the annular portion having the elongated axial length, by integrally forming the backup ring 25 with the annular space member 22, it is possible to reduce the slant and the entanglement of the backup ring 25.

(12) The rebound load can be received via the tubular portion of the reinforcing ring 21A which is buried in the first seal member 21, the annular space member 22, and the tubular portion of the reinforcing ring 23A which is buried in the second seal member 23. Therefore, these members double as the stopper member, and the number of parts can be reduced.

Figure 6:
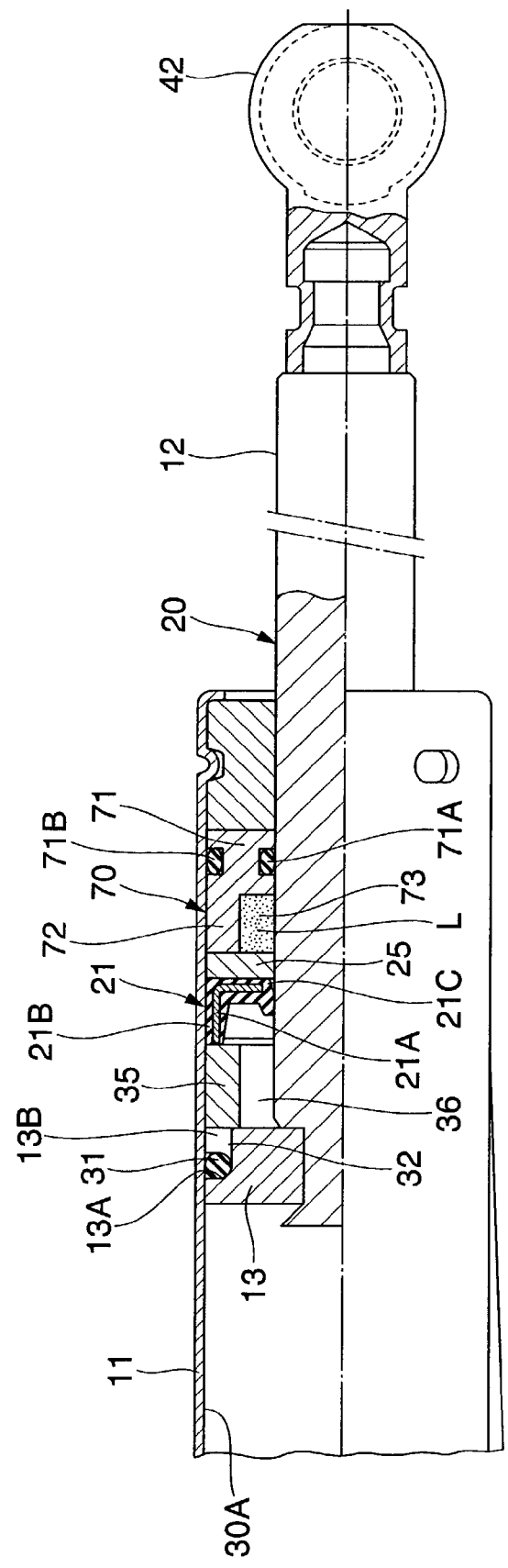
FIG. 6 is a cross sectional view showing a modified example of a gas spring.

A modified example in FIG. 6 is different from the embodiment in FIGS. 1 to 5 in that an annular space and seal member 70 is provided by integrally forming the space member 22 with the second seal member 23, and the backup ring 25 is independently provided.

The annular space and seal member 70 is structured such that O-rings 71A and 71B are fitted and attached to respective annular grooves in inner and outer peripheries of a main body portion 71, and an annular space portion 72 is protruded in an end portion of the main body portion 71 in a side of the piston 13. The O-ring 71A of the annular space and seal member 70 is in close contact with the outer periphery of the piston rod 12, and the O-ring 71B is in close contact with the inner periphery of the cylinder 11. The piston rod assembly 20 is formed in an annular chamber 73 defined among the first seal member 21, the O-rings 71A and 71B of the annular space, seal member 70, and the annular space portion 72, disclosed at the outer periphery of the piston rod 12, the device being previously charged with lubricant such as grease or the like.

In accordance with the present invention, it is possible to practice a method of manufacturing the gas spring such that the time for charging the pressurized gas into the cylinder can be reduced. Further, the gas spring can be made in an inexpensive manner by virtue of a reduced number of parts, where the gas spring has two seal members which are provided in the opening end portion of the cylinder so as to be spaced in the axial direction, and the lubricant such as grease or the like may be injected between these two seal members.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A method of manufacturing a gas spring comprising the steps of:
   a) forming a piston rod assembly comprising the steps of:
      i) providing a piston rod with a piston in a leading end portion, which is adapted to be slidably inserted into a cylinder,
      ii) providing a first seal member and a second seal member spaced in an axial direction, by inserting a rebound member, fitting the first seal member in close contact with an outer periphery of the piston rod, fitting an annular space member in close contact via a backup ring with the outer periphery of the piston rod, fitting the second seal member in close contact with the outer periphery of the piston rod, and inserting a rod guide which guides the piston rod, to the outer periphery of the piston rod and against a surface of the piston in accordance with this order from a side of the piston;
         fitting, to the outer periphery of the piston rod, in order against the piston, a rebound member, a first seal member in close contact with the piston rod, an annular space member having a backup ring in close contact with the piston rod, a second seal member in close contact with the piston rod, and a rod guide, the rebound member being in direct contact with the piston,
      iii) connecting a divided lubricant injection jig between the second seal member and the annular space member; and
      iv) injecting a lubricant in an annular chamber defined among the first seal member, the annular space member and the second seal member, in the outer periphery of the piston rod,
   b) providing at an opening portion of an inner portion of a cylinder the piston rod assembly in which a lubricant is previously injected,
   c) charging a pressurized gas into the cylinder from an opening portion of the cylinder under a sealed state,
   d) thereafter pressing the rod guide, thereby inserting the piston rod assembly into the cylinder from the opening portion of the cylinder such that the first seal member is in close contact with an outer periphery of the piston rod and an inner periphery of the cylinder, the annular space member is adjacent to the inner periphery of the cylinder, and the second seal member is in close contact with the outer periphery of the piston rod and the inner periphery of the cylinder, and
   e) fixing the rod guide to the cylinder by caulking the rod guide to the cylinder.

2. The method of manufacturing a gas spring according to claim 1, wherein the step of charging a pressurized gas further comprises the following steps of: attaching a gas charging jig having a through hole with the same axis as an axis of the cylinder to an outer periphery of the opening portion in the cylinder, in an airtight manner; forming a sealed space among the piston rod assembly, the gas charging jig and the inner periphery of the cylinder, by inserting the piston rod assembly to the through hole; charging the pressurized gas into the sealed space; and thereafter pressing the rod guide, thereby inserting the piston rod assembly into the cylinder and fixing the rod guide to the cylinder.

3. The method of manufacturing a gas spring according to claim 1, wherein the rod guide is fixed to the cylinder by forming an annular groove in an outer periphery of the rod guide, fixing the cylinder to the annular groove, and thereafter bending an opening end portion of the cylinder to an inner side.

4. The method of manufacturing a gas spring according to claim 1, wherein the first seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in a leading end portion, the first seal member being fitted and inserted to the outer periphery of the piston rod such that a pressure application surface of the seal lip portion is set to a side of the piston.

5. The method of manufacturing a gas spring according to claim 1, wherein the second seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in a leading end portion, the second seal member being fitted and inserted to the outer periphery of the piston rod such that a scraping surface of the seal lip portion is set to a side of the piston.

6. The method of manufacturing a gas spring according to claim 4, wherein the backup ring for the first seal member is interposed between the first seal member and the annular space member.

7. The method of manufacturing a gas spring according to claim 6, wherein the back up ring is integrally formed with the annular space member.

8. The method of manufacturing a gas spring according to claim 2, wherein the rod guide is fixed to the cylinder by forming an annular groove in an outer periphery of the rod guide, fixing the cylinder to the annular groove, and thereafter bending an opening end portion of the cylinder to an inner side.

9. The method of manufacturing a gas spring according to claim 2, wherein the first seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in a leading end portion, the first seal member being fitted and inserted to the outer periphery of the piston rod such that a pressure application surface of the seal lip portion is set to a side of the piston.

10. The method of manufacturing a gas spring according to claim 2, wherein the second seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in a leading end portion, the second seal member being fitted and inserted to the outer periphery of the piston rod such that a scraping surface of the seal lip portion is set to a side of the piston.

11. The method of manufacturing a gas spring according to claim 5, wherein a backup ring for the first seal member is interposed between the first seal member and the annular space member.

12. The method of manufacturing a gas spring according to claim 3, wherein the first seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in leading end portion, the first seal member being fitted and inserted to the outer periphery of the piston rod such that a pressure application surface of the seal lip portion is set to a side of the piston.

13. The method of manufacturing a gas spring according to claim 3, wherein the second seal member is formed by fixing in it a reinforcing ring having a tubular portion provided with an outer peripheral seal portion fitted to the inner periphery of the cylinder, and a support portion extending from one end of the tubular portion to an inner side and provided with a seal lip portion in a leading end portion, the second seal member being fitted and inserted to the outer periphery of the piston rod such that a scraping surface of the seal lip portion is set to a side of the piston.

* * * * *